United States Patent Office 3,274,156
Patented Sept. 20, 1966

3,274,156
CHLORINATED POLYCARBONATES
Kenneth P. Perry, Winston J. Jackson, Jr., and John R. Caldwell, Kingsport, Tenn., assignors to Eastman Kodak Company, Rochester, N.Y., a corporation of New Jersey
No Drawing. Filed Jan. 10, 1964, Ser. No. 336,872
10 Claims. (Cl. 260—47)

The present invention relates to novel polymeric compositions and their preparations, and prticularly concerns novel polycarbonates exhibiting a multiplicity of improved properties.

Polycarbonates having the recurring structural unit

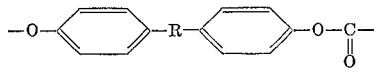

wherein R is selected from the group consisting of bivalent groups of the formulas

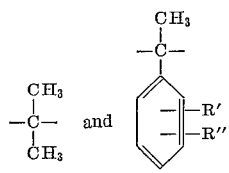

wherein R' and R'' are the same or different and are selected from the group consisting of a hydrogen atom and a chlorine atom, are thermoplastic resins possessing good combinations of toughness, impact strength, heat resistance, dimensional stability, and dielectric properties. Their uses include molded articles, films, and surface coatings.

Useful as these resins are, however, they are flammable and therefore limited in their applications. For example, these polymers cannot be used in safety photographic film base, which must be non-flammable. Moreover, fabric to be employed around open flame must look to other polymers. Although flammability is of major concern, other properties of these polymers such as film strength, heat distortion resistance and stiffness, important in photographic film base, and dielectric strength (constant) important in electrical condensers and the like, are in need of improvement.

Objects of the present invention, therefore, are: to provide polycarbonates having such improved properties as non-flammability, great heat distortion resistance, greater strength, greater stiffness, and increased dielectric strength; and to provide a commercially practicable process for preparing such polymers.

These and other objects hereinafter becoming apparent have been achieved in accordance with the present invention through the discoveries (1) that chlorine can be introduced into the polycarbonates by chlorination of the

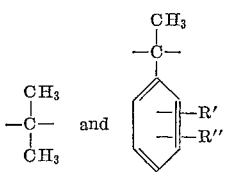

groups to form —CH$_2$Cl and —CHCl$_2$ groups and leave —CH$_3$ groups without causing appreciable polymer degradation; and (2) that such chlorination, to the proper degree, imparts the aforesaid desirable properties to the polymer.

The present polymers, therefore, have the recurring structural unit

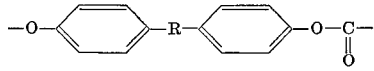

wherein R is at least one group selected from the group consisting of bivalent groups of the formulas

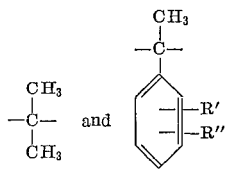

wherein R' and R'' are selected from the group consisting of hydrogen atoms and chlorine atoms, and wherein a portion of the hydrogens of the methyl groups of said bivalent groups are replaced with chlorine atoms. Desirably, the portion of chlorine substituted hydrogen is sufficient to give a chlorine content of between about 5 to 30% by weight of the polymer with between about 20 and about 30% by weight being the most preferred. It is noted that precise quantitative analysis of —CH$_2$Cl and —CHCl$_2$ group content is very difficult. However, it has been ascertained that as between the two, the —CH$_2$Cl groups predominate in the polymer.

The polycarbonate intermediates are conveniently prepared by reacting phosgene with the appropriate diphenol in a tertiary amine such as pyridine or triethylamine. Some of the amine may be replaced by a solvent for the polycarbonate, such as methylene chloride or ethylene dichloride. Usually it is necessary to add slightly over the theoretical amount of phosgene depending upon the amount of moisture in the system. The polymerizations may be carried out at 0–50° C. and preferably at below about 30° C. Buildup of the polymer is indicated by an increase in viscosity of the amine solution. At the completion of the polymerization, the solution is poured into water which dissolves the amine hydrochloride and the excess amines. If no other solvent such as methylene chloride is present, the polymer precipitates. Better washing can be obtained if a water-immiscible solvent such as methylene chloride is present with the tertiary amine. The polymer then can be thoroughly washed with water and precipitated by adding the solution to hexane, methanol, or other nonsolvent.

These polycarbonates can also be prepared by adding phosgene to a stirred aqueous mixture containing sodium hydroxide, the appropriate diphenol, a catalyst, and methylene chloride. On further stirring the polymer builds up in the methylene chloride phase. This process has been described by Schnell in Ind. Eng. Chem. 51, 158 (1959). See also Angew. Chem., 68, 633 (1956). The phosgene should preferably be 5 to 10 mole percent in excess relative to the diphenol.

The diphenols containing the group

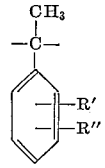

as defined above, are conveniently prepared by condensing the proper chlorinated ketone with phenol in concentrated HCl. Examples of such ketone intermediates are p-chloroacetophenone, 2,5-dichloroacetophenone, and 3,4-dichloroacetophenone. More specifically the process may be carried out as follows:

One mole of the ketone is dissolved in four moles of phenol. A trace of mercaptopropionic acid is added and gaseous hydrogen chloride is bubbled into the reaction mixture at 20° to 60° C. until it is saturated. The reaction vessel is sealed and set aside at room temperature until the reaction is complete as evidenced by the reaction product crystallizing from solution. The reaction mixture is then steam distilled to remove most of the excess phenol and other volatiles. The residue is dissolved in diethyl ether and the ether solution is extracted with dilute sodium carbonate until the extracts are colorless. The bisphenol product is extracted from the ether solution with dilute sodium hydroxide. The alkali solution is treated with decolorizing carbon and after filtration thereof the filtrate is carefully acidified with dilute hydrochloric acid. The crude bisphenol is filtered and crystallized from methylene chloride or other suitable solvent to obtain the pure product.

EXAMPLES OF POLYCARBONATE (INTERMEDIATE) PREPARATION

*Example 1.—Polycarbonate from 4,4'-(4-chloro-α-methylbenzylidene)diphenol*

Twenty-seven and nine-tenths grams (0.086 mole) of 4,4'-(4-chloro-α-methylbenzylidene)diphenol is dissolved in 9.6 g. (0.24 mole) of sodium hydroxide in 350 ml. of distilled water. This solution is cooled to 15° C. and 300 ml. of distilled methylene chloride is added. With good stirring, a solution of 9.4 g. (0.095 mole) of phosgene in 50 ml. of dry distilled methylene chloride is added within a period of 15 minutes at such a rate that the temperature does not exceed 15° C. Then 0.5 ml. of tri-n-butylamine is added. Stirring is continued to a point where the viscosity of the lower methylene chloride layer has reached a flow time of 1 minute 35 seconds through a standard pipette. Enough glacial acetic acid is then added to neutralize the alkali. The methylene chloride solution of the polymer is washed free of salts so that it gives a clear film when coated on a glass plate. The polymer is isolated by carefully precipitating the polymer by pouring the viscous dope into three volumes of methyl alcohol. The yield of white fibrous polymer was 90 percent of the theoretical value and it had an inherent viscosity of 0.5 in chloroform.

*Example 2.—Polycarbonate from 4,4'-(3,4-dichloro-α-methylbenzylidene)diphenol*

Using the procedure of Example 1, the following materials were employed:

35.9 g. (0.1 mole) of 4,4'-(3,4-dichloro-α-methylbenzylidene)diphenol
11.2 g. (0.28 mole) of sodium hydroxide
10.9 g. (0.11 mole) of phosgene in 50 ml. dry distilled methylene chloride
120 ml. of distilled water
190 ml. of distilled methylene chloride
1 ml. of tri-n-butylamine The yield of white fibrous polycarbonate was 90 percent of the theoretical value and it had an inherent viscosity of 0.51 in chloroform.

*Example 3.—Polycarbonate from 4,4'-(2,5-dichloro-α-methylbenzylidene)diphenol*

Using the procedure of Example 1, the following materials were employed:

35.9 g. (0.1 mole) of 4,4'-(2,5-dichloro-α-methylbenzylidene)diphenol
11.2 g. (0.28 mole) sodium hydroxide
10.9 g. (0.11 mole) phosgene in 50 ml. cold, dry distilled methylene chloride
100 ml. of distilled water
100 ml. of distilled methylene chloride
1 ml. of tri-n-butylamine The yield of white, fibrous polycarbonate was 89.5 percent of the theoretical value, and it had an inherent viscosity of 0.52 in chloroform.

The chlorinations are carried out by passing chlorine into solutions of the polymers in chlorinated aliphatic or aromatic hydrocarbons which are solvents for the polycarbonates, while illuminating with ultraviolet or visible light or while periodically adding a free-radical catalyst. Useful solvents include methylene chloride, ethylene dichloride, chloroform, tetrachloroethane, pentachloroethane, chlorobenzene, dichlorobenzene, etc. Tetrachloroethane is the preferred solvent. Examples of catalysts are acetyl peroxide, benzoyl peroxide and azoisobutyronitrile. It is sometimes advantageous to use both a catalyst and illumination. The reactions may be carried out at 0–100° C., but temperatures of 20–40° C. are normally used and are preferred. Appreciable degradation of the polymers takes place at the higher temperatures, and chlorination takes place very slowly at lower temperatures. Other chlorinating agents such as sulfuryl chloride or phosphorus pentachloride may be used, but chlorine is more effective. It is not necessary for an HCl acceptor to be in the reaction mixture, but it is often advantageous to use water to remove HCl from the organic phase and/or powdered calcium carbonate to neutralize the HCl. Less breakdown of the polymer during chlorination then takes place. After completion of the chlorination the organic layer is washed with sodium bicarbonate solution to ensure the neutralization of all of the HCl which had been formed. If calcium carbonate had been used in the reaction mixture and some carbonate remains, it is first removed by filtration or by adding a little acetic acid. After the polymer solution is thoroughly washed with water to remove all salts, it is slowly added to methyl alcohol or some other nonsolvent to precipitate the polymer as a white fibrous product.

Under the chlorination conditions employed, the chlorinated polymers consisted mainly of mixtures containing —$CH_2Cl$ groups, unchlorinated —$CH_3$ groups, and —$CHCl_2$ groups. Normally, the polymer became self-extinguishing when about 20% chlorine was introduced therein. By "self-extinguishing" is is meant that a film of the polymer stopped burning almost immediately when it was removed from a flame. Polymers containing more chlorine were even more resistant to burning, and they can be prepared containing up to 30% chlorine or more.

Chlorination of these polycarbonates increased the modulus of elasticity of the films. For instance, the modulus of a film of the 4,4'-isopropylidenediphenol (Bisphenol A) polycarbonate is about $3.3 \times 10^5$ p.s.i. whereas the modulus of the chlorinated polymer containing 30% chlorine is $4.0 \times 10^5$ p.s.i. This higher modulus makes the polymer more suitable for film base for photographic applications which require a high modulus. Also, chlorination increased the heat-distortion temperature of the films. The heat-distortion temperature (2% extension at 50 p.s.i. load) of a film of the 4,4'-isopropylidenediphenol polycarbonate is 154° C. whereas the heat-distortion temperature of the chlorinated polymer containing 30% chlorine is 185° C. Moreover, the dielectric constant of a film of the 4,4'-isopropylidenediphenol polycarbonate is 3.1 at 1 kc. and 25–150° C. whereas the dielectric constant of the chlorinated polymer containing 30% chlorine under these conditions is 3.6–3.7. The heat stability of the chlorinated polymers is improved by adding 0.1–4% of a compound of one or more of the following types: organo tin sulfur, organo tin, epoxy, aziridinyl, urea phosphite, unsaturated aliphatic, fatty acid salt (cadmium, zinc, or tin), or powdered calcium carbonate. They may be incorporated into films by dissolving or suspending them in the dope from which the film is cast. Also, they may be added to the polymer by dissolving or suspending them in a solvent in which the polymer is insoluble, such as methanol, adding the polymer, and then evaporating to dryness.

The following examples further illustrate the invention. All inherent viscosities were measured in chloroform.

Example 4

A polycarbonate prepared from 4,4'-isopropylidenediphenol and phosgene was chlorinated by the following procedure. The polymer (38.1 g., inherent viscosity 1.04) and 0.5 g. of benzoyl peroxide were dissolved in 450 ml. of tetrachlorethane and 250 ml. of water was added. While this mixture was stirred in a water bath and irradiated with a 300-watt visible lamp, chlorine was slowly passed in from a lecture bottle until the loss in weight thereof was 38 g. The reaction temperature was maintained at 27–32° C. by the water bath. The tetrachloroethane layer was then stirred with sodium bicarbonate solution, thoroughly washed with water, and slowly added to hexane to precipitate the polymer as a white fibrous material. The inherent viscosity was 0.73 and the chlorine content was 22.5%. A film cast from methylene chloride was self-extinguishing and had the following properties: tensile yield strength=11,600 p.s.i., tensile break strength=11,900 p.s.i., elongation at break= 80%, modulus=$3.8 \times 10^5$ p.s.i., heat-distortion temperature (2% shrinkage) at 5 p.s.i.=170° C., heat-distortion temperature (2% shrinkage) at 50 p.s.i.=183° C., dielectric constant (at 1.0 kc. and 25–150° C.)=3.4–3.6, and dissipation factor (at 1.0 kc. and 25–150° C.)= 1.0–0.4%.

Example 5

Example 4 was repeated with the addition of 53 g. of chlorine. The chlorinated polymer, which contained 29.8% chlorine, had an inherent viscosity of 0.62. A film, cast from methylene chloride, was self-extinguishing and had the following properties: tensile yield strength=12,600 p.s.i., tensile break strength=11,400 p.s.i., elongation at break=23%, modulus=$4.0 \times 10^5$ p.s.i., heat-distortion temperature (2% extension) at 50 p.s.i.=185° C., dielectric constant (at 1.0 kc. and 25–150° C.)=3.6–3.7, and dissipation factor (at 1.0 kc. and 25–150° C.)=0.8–0.5%.

Example 6

The procedure of Example 4 was modified. Ultraviolet illumination (275-watt lamp) was used instead of visible; 60 g. of powdered calcium carbonate was present in the reaction mixture; and 45 g. of chlorine was added. The chlorinated polymer, which contained 29.1% chlorine, had an inherent viscosity of 0.78, and a film cast from methylene chloride was self-extinguishing. It had the following properties: tensile break strength=11,200 p.s.i., elongation=20%, modulus=$4.2 \times 10^5$ p.s.i., heat-distortion temperature (2% extension) at 50 p.s.i.=190° C., dielectric constant (at 1.0 kc. and 25–150° C.)= 3.6–3.7, and dissipation factor (at 1.0 kc. and 25–150° C.)=1.0–0.5%.

Example 7

The polycarbonate of 4,4'-(4-chloro-α-methylbenzylidene)diphenol and phosgene was chlorinated by the method of Example 4. The product contained 23.2% chlorine. A film, cast from methylene chloride, was self-extinguishing. It had the following properties: tensile break strength=10,100 p.s.i., elongation=8%, modulus= $4.2 \times 10^5$ p.s.i., heat-distortion temperature (2% extension) at 50 p.s.i.=230° C., dielectric constant (at 1.0 kc. and 25–150° C.)=3.6–3.7, dissipation factor (at 1.0 kc. and 25–150° C.)=1.0–0.6%.

Example 8

The polycarbonate of 4,4'-(3,4-dichloro-α-methylbenzylidene)diphenol and phosgene was chlorinted by the method of Example 4. The product contained 30.8% chlorine. A film, cast from methylene chloride, was self-extinguishing. It had the following properties: tensile break strength=11,900 p.s.i., elongation=6%, modulus= $4.9 \times 10^5$ p.s.i., heat-distortion temperature (2% extension) at 50 p.s.i.=265° C., dielectric constant (at 1.0 kc. and 25–150° C.)=3.7–3.8, dissipation factor (at 1.0 kc. and 25–150° C.)=1.2–0.7%.

Example 9

Example 4 was repeated at 35–40° C., without illumination but with the addition of 0.5 g. of acetyl peroxide. Whenever the chlorination slowed down, 0.2 g. more of acetyl peroxide was added. The final polymer had an inherent viscosity of 0.54 and a chlorine content of 20.3%.

The invention has been described in detail with particular reference to preferred embodiments thereof, but it will be understood that variations and modifications can be effected within the spirit and scope of the invention as described hereinabove and as defined in the appended claims.

We claim:

1. A polycarbonate having the recurring structural unit

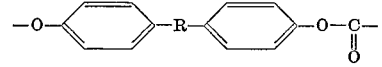

wherein R is at least one group selected from the group consisting of bivalent groups of the formulas

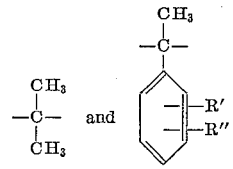

wherein R' and R" are selected from the group consisting of hydrogen atoms and chlorine atoms, and wherein a portion of the hydrogens of the methyl groups of said bivalent groups are replaced with chlorine atoms to form a random distribution of —CH$_2$Cl groups, —CHCl$_2$ groups and unchlorinated methyl groups.

2. A polycarbonate having the recurring structural unit

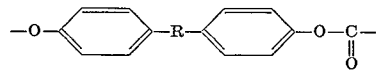

wherein R is at least one group selected from the group consisting of bivalent groups of the formulas

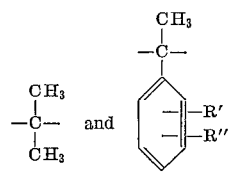

wherein R' and R" are selected from the group consisting of hydrogen atoms and chlorine atoms, wherein a sufficient portion of the hydrogens of the methyl groups of said bivalent groups are replaced with chlorine atoms to form a random distribution of —CH$_2$Cl groups, —CHCl$_2$ groups and unchlorinated methyl groups and to give a chlorine content of between about 5 and about 30% by weight of the polymer.

3. A polycarbonate having the recurring structural unit

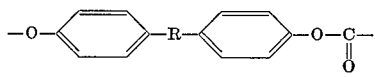

wherein R is at least one group selected from the group consisting of bivalent groups of the formulas

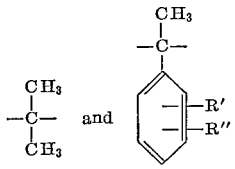

wherein R' and R" are selected from the group consisting of hydrogen atoms and chlorine atoms, wherein a sufficient portion of the hydrogens of the methyl groups of said bivalent groups are replaced with chlorine atoms to form a random distribution of —CH$_2$Cl groups, —CHCl$_2$ groups and unchlorinated methyl groups and to give a chlorine content of between about 20 and about 30% by weight of the polymer.

4. The process for preparing the polymers of claim 1 comprising introducing chlorine into a solution of a polycarbonate having the recurring structural unit

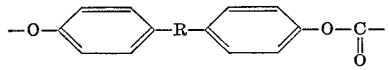

wherein R is at least one group selected from the group consisting of bivalent groups of the formulas

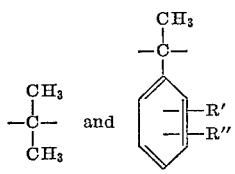

wherein R' and R" are selected from the group consisting of hydrogen atoms and chlorine atoms in the presence of a chlorination promoter selected from the group consisting of ultraviolet radiation, visible light, and a free-radical catalyst.

5. The polycarbonate of 4,4' - isopropylidenediphenol wherein a substantial portion of the hydrogen atoms of the of the neopentyl methyl groups have been replaced with chlorine atoms to form a random distribution of —CH$_2$Cl groups, —CHCl$_2$ groups and unchlorinated neopentyl methyl groups.

6. The polycarbonate of 4,4' - (4 - chloro - α - methylbenzylidene)diphenol wherein a substantial portion of the hydrogen atoms of the neopentyl methyl group have been replaced with chlorine atoms to form a random distribution of —CH$_2$Cl groups, —CHCl$_2$ groups and unchlorinated neopentyl methyl groups.

7. The polycarbonate of 4,4' - (3,4 - dichloro - α-methylbenzylidene)diphenol wherein a substantial portion of the hydrogen atoms of the neopentyl methyl group have been replaced with chlorine atoms to form a random distribution of —CH$_2$Cl groups, —CHCl$_2$ groups and unchlorinated neopentyl methyl groups.

8. A film comprised of the composition of claim 1.
9. A fiber comprised of the composition of claim 1.
10. A molded article comprised of the composition of claim 1.

References Cited by the Examiner

UNITED STATES PATENTS

| | | | |
|---|---|---|---|
| 3,062,781 | 11/1962 | Bottenbruch et al. | 260—47 |
| 3,106,544 | 10/1963 | Laakso et al. | 260—47 |

FOREIGN PATENTS

| | | |
|---|---|---|
| 1,264,736 | 5/1961 | France. |
| 1,284,226 | 1/1962 | France. |

SAMUEL H. BLECH, *Primary Examiner.*